United States Patent [19]
Fassbender

[11] 3,784,918

[45] Jan. 8, 1974

[54] STORAGE CIRCUITS

[75] Inventor: Charles Joseph Fassbender, San Diego, Calif.

[73] Assignee: RCA Corporation, Princeton, N.J.

[22] Filed: Oct. 20, 1972

[21] Appl. No.: 299,312

[52] U.S. Cl. ..................... 328/97, 307/208, 328/37, 328/51, 328/92, 328/96

[51] Int. Cl. H03k 17/04, H03k 17/28, H03k 19/20

[58] Field of Search .................. 307/208, 215, 218, 307/238, 289, 221 R, 223 R; 328/34, 37, 39, 51, 55, 61, 92, 94, 95, 96, 97

[56] References Cited

UNITED STATES PATENTS

| | | | |
|---|---|---|---|
| 3,075,091 | 1/1963 | Homan | 328/97 X |
| 3,308,384 | 3/1967 | Wright | 328/51 |
| 3,339,145 | 8/1967 | MacSorley | 328/92 |
| 3,508,079 | 4/1970 | Moll et al. | 307/218 X |
| 3,509,366 | 4/1970 | Howe, Jr. et al. | 307/214 X |
| 3,523,252 | 8/1970 | Chikli-Pariente | 328/37 |
| 3,679,915 | 7/1972 | Kriger | 307/215 X |

OTHER PUBLICATIONS

Homan, "Latching Circuitry," IBM Tech. Dis. Bull., Vol. 4, No. 8, p. 66–67, 1/1962.

Irwin, "Format Verication," IBM Tech. Dis. Bull, Vol. 14, No. 5, p. 1,441–1,443, 10/1971.

*Primary Examiner*—Rudolph V. Rolinec
*Assistant Examiner*—L. N. Anagnos
*Attorney*—H. Christoffersen and Samuel Cohen

[57] ABSTRACT

Each stage of a register includes first and second logical product gates, a logical sum gate receptive of the signals produced by the logical product gates and a feedback connection from the logical sum gate to the second logical product gate. A data signal is applied to the first logical product gate. In response to one binary value of a timing pulse, the first logical product gate is primed and the second disabled and in response to the other binary value of the timing pulse, the first logical product gate is disabled and the other primed.

6 Claims, 4 Drawing Figures

STORAGE CIRCUITS

BACKGROUND OF THE INVENTION

Registers are commonly employed in many digital circuits. Each register stage may include two or more logical gates which are cross connected to form a flip-flop, an input gate (or gates) for the selection of data signals to be applied to the flip-flop and an output gate (or gates) for transmitting the stored signal to some other circuit. The registers are located in paths through which information signals flow and the speed at which the signals can be transmitted is limited by the effective length of (the delay inserted by) the longest one of these paths. To achieve high speed operation, as required, for example, in the processor of a modern digital computer, certain aspects of the register operation must be closely controlled. These are discussed briefly below.

In the case in which there are several input signals available at the input circuit of a register stage, one of them must be selected and passed through that register stage as quickly as possible. The less the delay through the register stage, the faster the processor can operate. This assumes that the clock or timing signal employed to cause the data signal to flow into the register occurs before the data signal is present.

When the reverse is the case, that is, when the data signal is present at the time the clock or timing signal arrives, the time delay between the occurence of the clock signal and the production of the corresponding register stage output signal should be as small as possible. The less time it takes for the output signal to be produced, the sooner the output signal can be operated on.

A third factor which influences circuit speed is how fast the clock signal can be removed from the register stage after the input data signal has arrived. The sooner the clock signal can be removed, the sooner the input data can begin to change in response to the start of a new operation. The speed of the processor is limited by how fast it can start a new operation after it completes the preceding operation.

In similar fastion, the data signal should not have to remain present at the input circuit of a register stage for a long period of time. The time between the presence of a data signal at the register and the time the signal becomes latched or stored is one of the factors which influences the length of time the processor must wait before starting a new operation.

A final factor which must be considered is the load the timing or clock pulse must drive. All operations within a synchronous processor are started by clock signals. If a clock signal must drive more than a given number of loads, it is necessary to include amplifier circuits to provide additional clock pulse power and these introduce delays into the system.

SUMMARY OF THE INVENTION

First and second logical product gates and a logical sum gate receptive of the signals produced by the first and second gates and supplying its output signal to the second gate. A data signal is applied to the first gate. A control means primes the first gate and disables the second in the presence of a timing signal and disables the first gate and primes the second in response to the absence of said timing signal.

DETAILED DESCRIPTION

Figure 1:
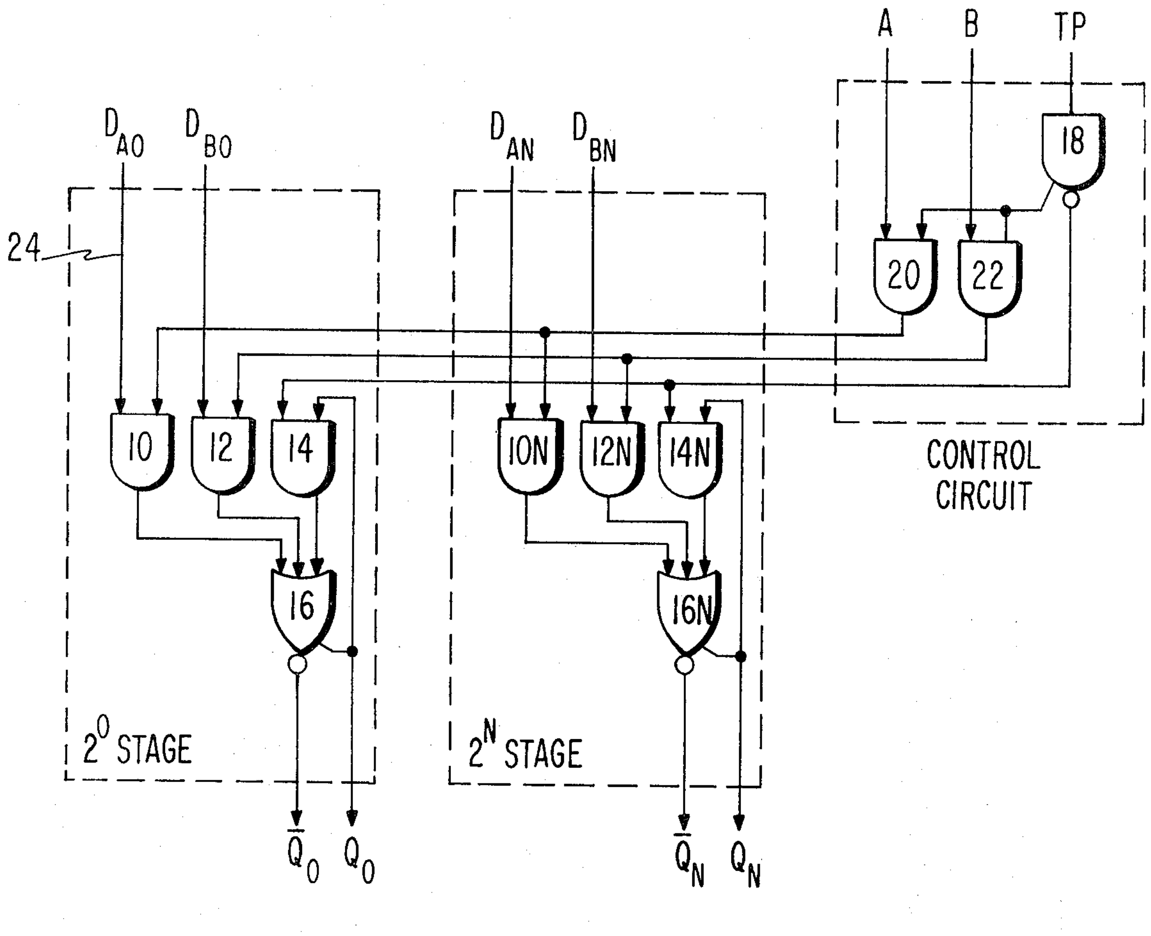
FIG. 1 is a logic diagram of one embodiment of the invention.

The circuit of FIG. 1 is an $n+1$ stage register, only the first and last stages of which are shown. These are legended the $2^0$ and $2^n$ stages, respectively. As the stages are identical, only the first one will be discussed. It includes three logical product gates such as AND gates 10, 12 and 14 and a gate 16 which produces a logical sum signal and its complement. Gate 16 may be an OR-NOR gate. AND gate 10 is connected to receive a data signal $D_{A0}$ and AND gate 12 is connected to receive a data signal $D_{B0}$. The $D_{A0}$ signal may be one arriving from the $2^0$ stage of an A register (not shown) and the $D_{B0}$ signal may be one arriving from the $2^0$ stage of a $B$ register (not shown).

The control circuit for the register is common to all of the register stages. It includes a gate 18 which produces normal and complemented outputs and two AND gates 20 and 22. A timing pulse TP is applied to gate 18. The normal output of this gate is applied to AND gates 20 and 22 and the complementary output of this gate is applied to the AND gates 14 . . . 14*N* of the register. A control signal A is applied to AND gate 20 and a control signal B is applied to AND gate 22. When $A$=1 it is a command to transfer the contents of the $A$ register to the register shown and, similarly, when $B$=1 the circuit is commanded to transfer the contents of the $B$ register to the register shown. For the present, it may be considered that $A$ and $B$ cannot both be 1 at the same time. AND gate 20 applies its output to the AND gates 10 . . . 10N and AND gate 22 applies its output to the AND gates 12 . . . 12N.

Before discussing the operation of the circuit, the various delays in the circuit will be defined. In one particular circuit which was implemented with integrated circuits employing so called "Schottky $T^3L$" gates, the delay through the path which includes AND gate 12 and OR-NOR gate 16 was 8 nanoseconds (ns), in the worst case. The same delay occurs in the path 10, 16; the same in the path 14, 16. For purposes of the present discussion, this 8 ns delay is considered one gate delay interval. The reason is that the four gates 10, 12, 14, 16 are integrated into a single package and it is the delays through the complete paths of this package which are meaningful. The output signals produced by gates 10, 12, 14 only exist as intermediate non-standard voltages within the package, and, as a practical matter, are unavailable to the circuit designer.

In the same circuit, the delay introduced by a gate such as 20 is also 8 nanoseconds, that is, one gate delay interval and the delay introduced by gate 18 also is 8 nanoseconds, one gate interval. (In practice, to permit use of the same circuit in as many places as possible, a gate such as 20 is implemented by the same integrated circuit as a register stage and includes an AND gate followed by an OR-NOR gate, with only the OR output used, and a gate such as 18 is implemented in the same way with only the NOR output used; this is the reason for the 8 ns delay rather than a shorter delay.)

Figure 2:
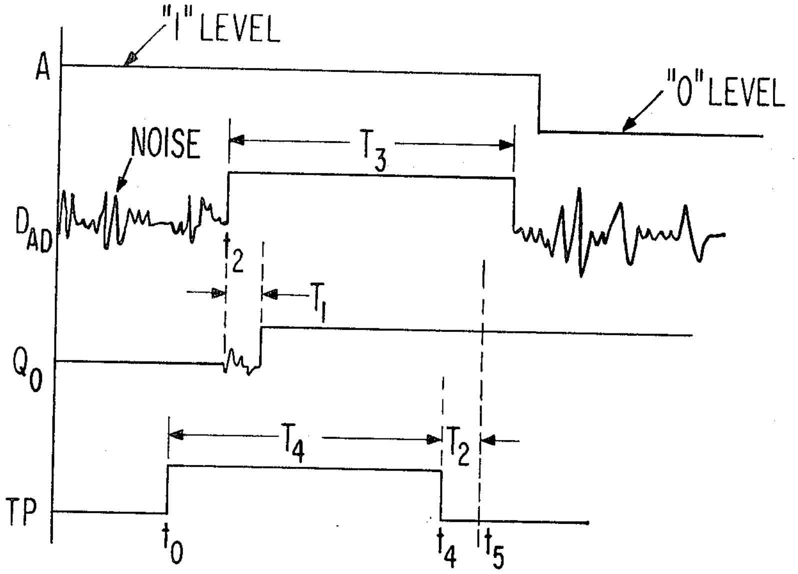
FIG. 2 is a drawing of waveforms to help explain the operation of the circuit of FIG. 1.

The operation of the circuits under one set of conditions is depicted in FIG. 2. The control signal $A$=1 primes AND gate 20 and the control $B$=0 disables AND gate 22. Noise initially is present on line 24. At time $t_0$ the timing pulse TP goes high, that is, it changes from a value representing a 0 to a value representing a 1. The 1 output of gate 18 primes AND gate 20 and as $A$ also is equal to 1, this gate becomes enabled. The 1 output signal of gate 20 primes gates 10 . . . 10N. The register is now ready for the input data to "firm up" (for the input signals to arrive at the data input terminals to gates 10 . . . 10N). At time $t_2$, a data signal $D_{A0}$ firms up, that is, at time $t_2$, $D_{A0}$ no longer varies in amplitude but is established at a high or 1 level. It now takes only one gate delay, that is, 8 nonaoseconds, for $Q_0$ to change to 1. Referring to FIG. 2, the time interval $T_1$ between the leading edges of $D_{A0}$ and $Q_0$ is 8 nanoseconds. This is an important feature of this invention--namely, the time through the input selection logic circuit plus the time through the register itself takes only 1 gate delay (8 ns). Conventional circuits do not integrate the input selection logic circuit (the input gate) with the register storage circuit and consequently require a greater number of gate delay intervals for performing the same function.

At time $t_4$, TP changes to 0. One gate delay later, the complementary output signal of gate 18 changes to 1 and this latches the register. In other words, if at time $t_5$ of FIG. 2, $Q_0$ is 1, then that 1 will remain stored in the $2^0$ stage. The reason is that both inputs to gate 14 now are 1 and the feedback connection maintains this condition so long as $TP$=0.

When the complementary output of gate 18 changes to 1, that is, at time $t_5$ of FIG. 2, gate 10 is still being primed. The reason is that the uncomplemented output of gate 18 has to pass through a second gate 20 before it reaches the gate 10. Thus, when TP changes to 0, one gate delay later the normal output of gate 18 changes to 0 and one additional gate delay later, the output of gate 20 changes to 0. This form of operation is required as it insures latching of the signal prior to the time that the gates 10 (or 12) are disabled.

Summarizing the above, with the assumption that the data signal arrives more than some minimum interval of time (at least two gate delay intervals in the given example) after the timing pulse, this signal becomes selected and stored in one gate delay interval. The register is latched within one gate delay after TP changes back to 0.

In the previous discussion it was stated that $A$ and $B$ are not both 1 at the same time. The circuit also can operate when $A$= $B$=1 but this mode of operation is used only to a limited extent. When $A$=$B$=1, the output signal $Q_j$ of the $2^j$ register stage is the logical sum of $D_{AJ}$ and $D_{BJ}$, where $j$=0, 1, . . . $N$.

It was also stated that the control circuit 18, 20, 22 is common to the entire register. In one practical system, this circuit was capable of driving nine loads which implies a nine stage register (for storing eight information bits and one parity bit). For a larger register such as one with between ten and eighteen stages, two control circuits would be employed.

Figures 3, 4:
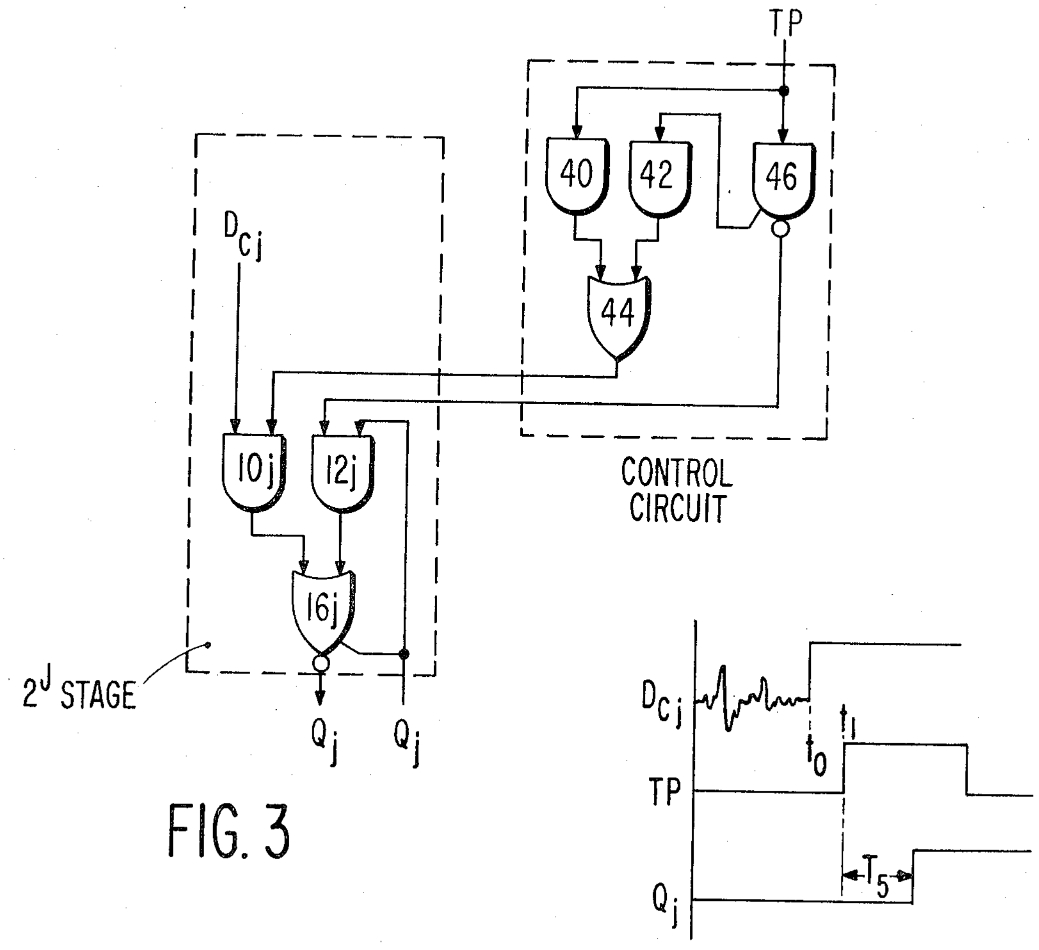
FIG. 3 is a logic diagram of a second form of the invention.
FIG. 4 is a drawing of waveforms present during the operation of the circuit in FIG. 3.

A second embodiment of the invention is illustrated in FIG. 3. Only one of the register stages, the $2^J$ stage is illustrated. It includes two AND gates, 10$j$ and 12$j$, and an OR-NOR gate 16$j$. The register represented by this stage is designed to receive signals from only one other register, the C register (not shown).

The control circuit for the register of FIG. 3 includes two gates, 40 and 42, an OR gate 44 and gate 46. Gates 40 and 42 produce a normal version of the input signal and gate 46 produces a normal version and its complement. The FIG. 3 circuit provides higher speed performance than the FIG. 1 circuit in the case in which the timing pulse arrives after the data signal is present. Note that in the operation discussed in FIG. 1 circuit, the timing pulse arrived first.

The operation of the FIG. 3 circuit is depicted in FIG. 4. At time $t_0$ the data signal $D_{Jc}$ "firms up." At some later time, the timing pulse TP changes to 1. The TP signal is applied directly to gate 40 and one gate delay later a 1 is present at the output terminal of OR gate 44. One additional gate delay later, that is, the delay introduced by gates 10$j$ and 16$j$, $Q_j$ changes to 1. Thus, in the situation in which the timing pulse arrives after the data signal occurs, two gate delays are required for the $Q$ signal to be produced.

The latching time of the FIG. 3 circuit is the same as that of the FIG. 1 circuit. When TP changes to 0, the complementary output signal of gate 46 changes to 1 within one gate delay interval and this latches the $Q$ signal. When TP changes to 0, the output of gate 44 tries to change to 0 also within one gate delay interval, through the path 40, 44. However, it is prevented from doing so by the alternate path 42, 44. This alternate path receives a 0 after one gate delay introduced by gate 46 and then requires one additional gate delay (that introduced by gates 42, 44) to change to 0. Thus, as in the FIG. 1 circuit, during the time $Q_j$ is being latched, gate 10$j$ is maintained primed and one gate delay after latching, gate 10$j$ is disabled.

The circuit of FIG. 1 also will operate under the same conditions as described for the FIG. 3 circuit. However, the time required to produce a $Q$ output will be longer. In the FIG. 1 circuit if, for example, $D_{A0}$ is a 1 and $A$ is a 1 before TP changes to 1, the following occurs. When TP changes to 1, there is one gate delay introduced by gate 18 and a second gate delay introduced by gate 20. Therefore, the gating of the $D_{A0}$ signal into gate 10 cannot start to occur until two gate delays after TP changes to 1. Then, as previously explained, one additional gate delay is required for $Q_0$=1 to be produced. In the FIG. 3 circuit, under the same set of circumstances only one gate delay is required for the gate 10$j$ to be primed, and one additional gate dleay is required for the $Q_j$ signal to be produced.

A disadvantage of the FIG. 3 circuit compared to the FIG. 1 circuit is that the load on the timing pulse source is two gates 40 and 46 whereas in the FIG. 1 circuit it is only a single gate 18.

It is to be understood that while the FIG. 1 circuit is shown to be adapted to receive the contents of either of two different registes, with minor circuit change it can operate to receive the contents of only a single register or of three or more registers. In any of these cases, the number of AND gates per stage is one more than the number of input registers, the additional AND gate being employed for latching purposes. Similarly, it is to be understood that the register stages of the FIG. 3 circuit can be designed to accept the contents of one of a plurality of different registers rather than that of only a single register.

The circuits of the present application are suitable for very fast operation. In the FIG. 1 circuit, for example, where the timing pulse TP arrives before the information signals "firm up," one gate delay interval after TP occurs a decision is made of which of two signals $D_{AJ}$ or $D_{BJ}$ should be selected. The signal $Q_J$ occurs one gate delay interval after the $D$ signal. Shortly after this, the timing pulse TP may be terminated and one gate delay interval later, the stage latches. This implies that $T_3$ (FIG. 2) may be relatively short and $T_4$, the timing pulse duration, also is relatively short. Also, the interval between successive data signal $D$ is relatively short.

In the FIG. 3 circuit where the timing pulse TP arrives after the data signal D has firmed up, similar considerations apply. Now the output signal $Q$ appears two gate delays after $TP$, which is still quite fast. Other delays already have been discussed.

In both FIG. 1 and FIG. 3 circuits the loading on the timing pulse generator is relatively small--one gate 18 for the complete register in the FIG. 1 circuit and two gates 40 and 46 for the complete register of the FIG. 3 circuit.

What is claimed is:

1. A register comprising, in combination:

a a plurality of register stages, each such stage comprising:

first and second logical product gates;

a logical sum gate connected to receive the signals produced by said first and second gates and supplying its output signal to said second gate; and an input lead for a data signal connected to said first gate; and a control circuit common to all of said register stages, said control circuit comprising first control gate means responsive to a timing signal for applying a disabling signal to all of said second gates when said timing signal has one binary value and for applying a priming signal to all of said second gates when said timing signal has the other binary value, and for producing also a second signal having one binary value when said timing signal has said one binary value and a second binary value when said timing signal has the other binary value, and second control gate means responsive to a control signal and to said second signal for applying a priming signal to the first gate of all of said stages when said control signal and said one binary value of second signal are present and for applying a disabling signal to the first gate of all of said stages when either the control signal or said one binary valve of second signal is absent.

2. A register as set forth in claim 1, wherein said second control gate means comprises a single AND gate.

3. A regiser as set forth in claim 1, wherein said control signal comprises said timing signal, and wherein said second control gate means comprises a first non-inverting gate receptive of said second signal, a second non-inverting gate receptive of said timing signal, and a logical sum gate connected to receive the outputs of said first and second non-inverting gates and supplying its output to the first gate of all of said stages.

4. A register as set forth in claim 1, wherein each first gate and the logical sum gate connected thereto together introduce a total delay of one stage delay, each second gate and the logical sum gate connected thereto together introduce a total delay of one stage delay, said first control gate means introduces one stage delay, and said second control gate means introduces one stage delay.

5. A register as set forth in claim 1 wherein each stage includes a third logical product gate, and an input lead for a second data signal connected to that gate, and supplying its output to the logical sum gate for that stage, and wherein said control circuit includes another control gate means receptive of another control signal and of said second signal for applying a priming signal the third logical product gate of all stages when said another control signal and said one value of second signal are present.

6. A register as set forth in claim 1, wherein said first gate means of said control circuit comprises a gate for producing said second signal and its complement, said complementary signal comprising said disabling signal.

* * * * *